US009054569B2

United States Patent
Kuroda et al.

(10) Patent No.: US 9,054,569 B2
(45) Date of Patent: Jun. 9, 2015

(54) ROTARY ELECTRIC MACHINE

(71) Applicant: MITSUBISHI ELECTRIC CORPORATION, Chiyoda-ku, Tokyo (JP)

(72) Inventors: Motokazu Kuroda, Chiyoda-ku (JP); Masaki Hinoue, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 219 days.

(21) Appl. No.: 13/927,935

(22) Filed: Jun. 26, 2013

(65) Prior Publication Data
US 2014/0232222 A1   Aug. 21, 2014

(30) Foreign Application Priority Data

Feb. 15, 2013   (JP) ................................. 2013-027643

(51) Int. Cl.
*H02K 1/00*   (2006.01)
*H02K 3/50*   (2006.01)

(52) U.S. Cl.
CPC ....................................... *H02K 3/50* (2013.01)

(58) Field of Classification Search
USPC ............... 310/71; 29/860, 863; 439/424, 814, 439/877, 13
See application file for complete search history.

(56) References Cited

U.S. PATENT DOCUMENTS

| | | | | |
|---|---|---|---|---|
| 2,759,161 | A | * | 8/1956 | Berg .............................. 439/424 |
| 3,333,083 | A | * | 7/1967 | Brunstetter et al. ........ 219/56.22 |
| 3,717,842 | A | * | 2/1973 | Douglas, Jr. ..................... 29/860 |
| 3,739,323 | A | * | 6/1973 | Spors ............................. 439/875 |
| 4,317,277 | A | * | 3/1982 | Bennett et al. ................... 29/860 |
| 4,642,885 | A | * | 2/1987 | King ............................... 29/596 |
| 4,902,867 | A | * | 2/1990 | Haramaki et al. .......... 219/85.18 |
| 4,913,678 | A | * | 4/1990 | Avellino et al. ............... 439/879 |
| 5,808,260 | A | * | 9/1998 | Asakura et al. ............ 219/56.22 |
| 5,914,546 | A | * | 6/1999 | Terakado et al. ............... 310/71 |
| 2002/0033646 | A1 | * | 3/2002 | Tanaka et al. ................... 310/71 |
| 2003/0062781 | A1 | * | 4/2003 | Murata et al. ................... 310/71 |
| 2003/0129856 | A1 | | 7/2003 | Takizawa et al. |
| 2007/0001526 | A1 | * | 1/2007 | Okada et al. .................... 310/71 |

FOREIGN PATENT DOCUMENTS

JP   2003-209944 A   7/2003

* cited by examiner

*Primary Examiner* — Thanh Lam
(74) *Attorney, Agent, or Firm* — Sughrue Mion, PLLC; Richard C. Turner

(57) ABSTRACT

An object of the present invention is to provide a rotary electric machine that can improve the reliability of a connection terminal by preventing brazing material applied to butting portions of the connection terminal from flowing out. The rotary electric machine according to the present invention has, on at least one of the inner and outer circumferences of a hole portion 22 of a connection terminal 20, a groove portion 22*a*, 22*b*, 22*c*, 22*d*, or 22*e* that can prevent brazing material 24 from flowing out from between butting portions 23, thereby solving a problem that a crack occurs on the connection terminal upon fusing of the connection terminal and a lead conductive wire.

9 Claims, 6 Drawing Sheets

F I G. 3A
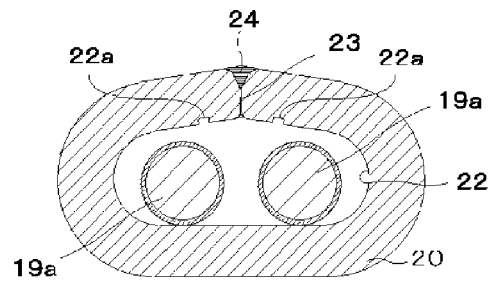
F I G. 3B
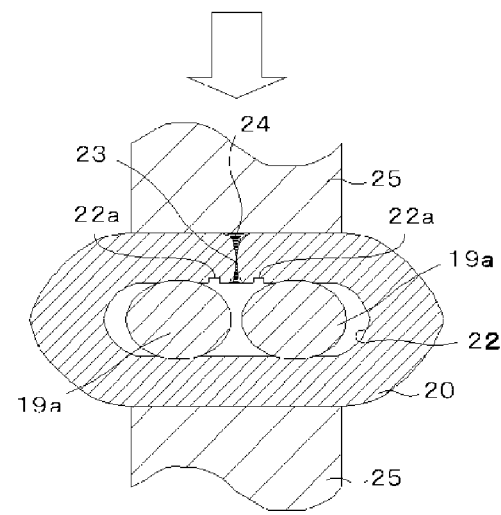
F I G. 3C
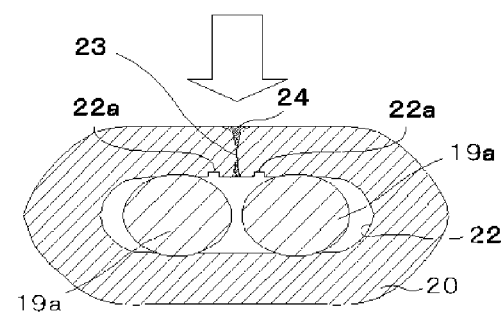

ROTARY ELECTRIC MACHINE

BACKGROUND OF THE INVENTION

1. Field of the Invention

The present invention relates to a rotary electric machine such as a vehicle AC generator, and particularly, to a terminal treatment structure of a stator lead conductive wire.

2. Description of the Background Art

As a generator provided on a vehicle, normally, a three-phase AC generator having a Lundell-type rotor is used.

In such an AC generator, on the stator side, three-phase stator coils are wound on a stator core, and the stator coil has a lead conductive wire. The end of the lead conductive wire has a metallic connection terminal attached thereon, and thereby is connected and fixed to a three-phase full-wave rectifier provided on a bracket.

A copper wire having an insulation coating with a high heat resistance, such as a polyamide-imide electric wire, is used for the stator coil. The lead conductive wire is formed by the copper wire extending from the stator coil. The connection terminal is formed by copper-based metal. Joining between the connection terminal and the lead conductive wire has been made as shown in Patent Document 1 (Japanese Laid-Open Patent Publication No. 2003-209944), for example.

That is, the connection terminal has a tube-shaped hole portion having no discontinuity, which is formed by rolling a copper plate into a circular-tube shape and joining its butting portions by welding using copper phosphorus brazing material. The lead conductive wire is inserted into the hole portion, and from the outside, pressure and current are applied to the connection terminal by an electrode, whereby fusing (pressure resistance welding) is performed. The temperature upon the welding increases up to about 1000° C. The circular-tube-shaped hole portion is flattened by the applied pressure and the temperature increase, and two lead conductive wires whose insulation coatings are carbonized are arranged in a row in the flattened hole portion. Thus, the two lead conductive wires are joined with the connection terminal.

As described above, upon the manufacture of the connection terminal, a copper plate is rolled into a circular-tube shape and its butting portions are joined into a circular-tube shape through brazing with copper phosphorus brazing material applied thereto. Upon the brazing, the copper phosphorus brazing material flows out from the butting portions of the connection terminal, whereby the copper phosphorus brazing material adheres on the inner circumference or the outer circumference of the circular-tube-shaped hole portion beyond a predetermined range, or the copper phosphorus brazing material adheres on a portion (torsional portion) having a low strength of the connection terminal. As a result, such a portion on which the copper phosphorus brazing material has adhered is hardened, so that the connection terminal becomes hard to be deformed.

In addition, the following problem arises. That is, in the state in which the copper phosphorus brazing material has adhered, when fusing is performed for the connection terminal and the lead conductive wire, a tin coating on the surface of the connection terminal or the copper phosphorus brazing material is melted into liquid metal by the fusing, and then a "liquid-metal embrittlement phenomenon" occurs in which the tin or the copper phosphorus brazing material in a liquid metal state diffuses on a metal body at a tensile-stress-applied portion (particularly, a torsional portion near the base of the connection terminal protruding from the circular-tube-shaped portion) of the connection terminal and thereby the metal body becomes brittle. As a result, a crack occurs at the moment when the metal body is cooled. In addition, if the copper phosphorus brazing material has adhered on the outer circumference of the hole portion of the connection terminal in a thick amount and over a wide range, a clearance in the shaft direction between the outer circumference of the hole portion of the connection terminal and a blade of a cooling fan facing to the outer circumference in the shaft direction becomes small. Then, if salt water or the like invades the clearance in the shaft direction, leakage current flows between the connection terminal and an end of the blade of the cooling fan, and electrochemical corrosion therebetween is promoted, whereby the connection terminal may be damaged.

SUMMARY OF THE INVENTION

The present invention has been made to solve the above problems, and an object of the present invention is to provide a rotary electric machine that can improve the reliability of a connection terminal by preventing brazing material applied to butting portions of the connection terminal from flowing out.

A rotary electric machine according to the present invention includes: a conductive wire having an insulation coating; and a connection terminal joined with the conductive wire. The connection terminal has a tube-shaped hole portion having no discontinuity, which is formed by rolling metallic material to be butted and joining butting portions via brazing material through brazing work, so that the conductive wire inserted into the hole portion is joined with the connection terminal by fusing. A groove portion that can prevent the brazing material from flowing out from between the butting portions is provided on at least one of the inner circumference and the outer circumference of the hole portion of the connection terminal.

In the rotary electric machine according to the present invention, since the groove portion that can prevent the brazing material from flowing out from between the butting portions is provided on at least one of the inner circumference and the outer circumference of the hole portion of the connection terminal, even if the brazing material having filled the butting portions flows out from between the butting portions upon brazing, the flowing brazing material flows into the groove portion, so that the brazing material will not further flow out beyond the groove portion. Therefore, the flowing brazing material does not adhere on the inner circumference or the outer circumference of the hole portion of the connection terminal beyond a predetermined range, and the flowing brazing material does not reach a torsional portion near the base of a terminal portion extending from the hole portion of the connection material. Therefore, upon fusing of the connection terminal and the conductive wire, a portion having a small mechanical strength is not hardened or does not become hard to be deformed, and a "liquid-metal embrittlement phenomenon" does not occur. Therefore, the problem that a crack occurs can be solved.

The foregoing and other objects, features, aspects and advantages of the present invention will become more apparent from the following detailed description when read in conjunction with the accompanying drawings.

BRIEF DESCRIPTION OF THE DRAWINGS

FIGS. 3A to 3C are sectional views showing a joining process of a lead conductive wire and a connection terminal according to the first embodiment of the present invention;

DETAILED DESCRIPTION OF THE PREFERRED EMBODIMENTS OF THE INVENTION

First Embodiment

Figure 1:
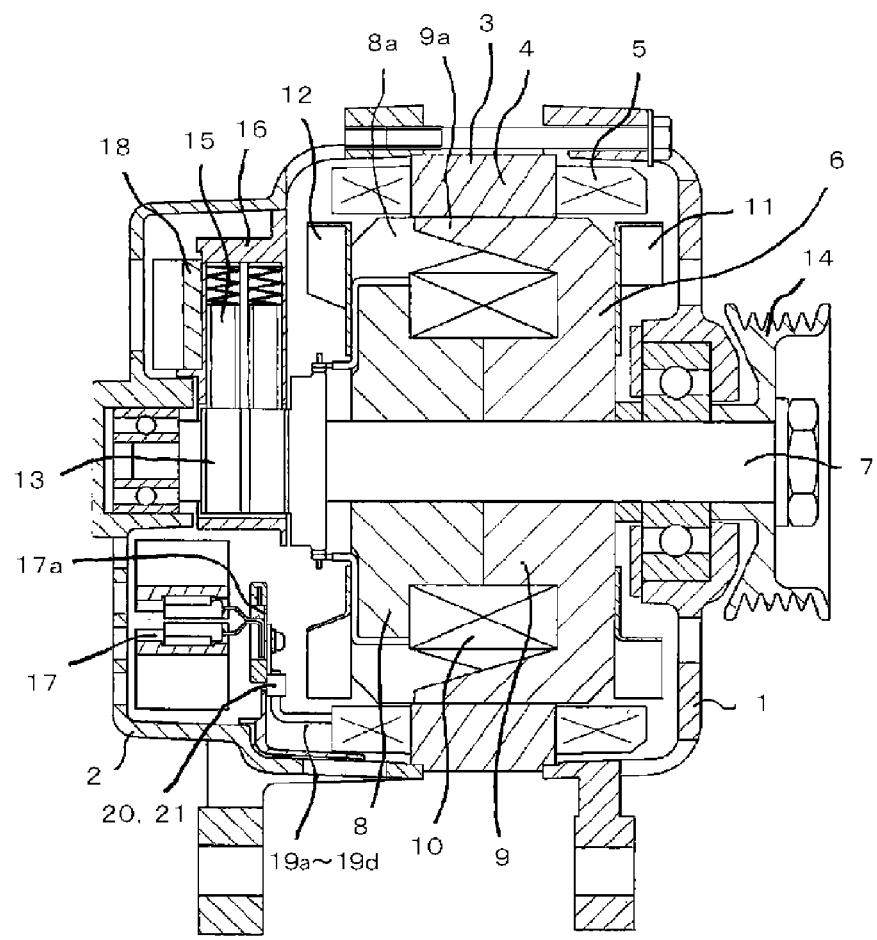
FIG. 1 is a sectional view showing the entire configuration of a vehicle AC generator according to the first embodiment of the present invention.
Figure 2:
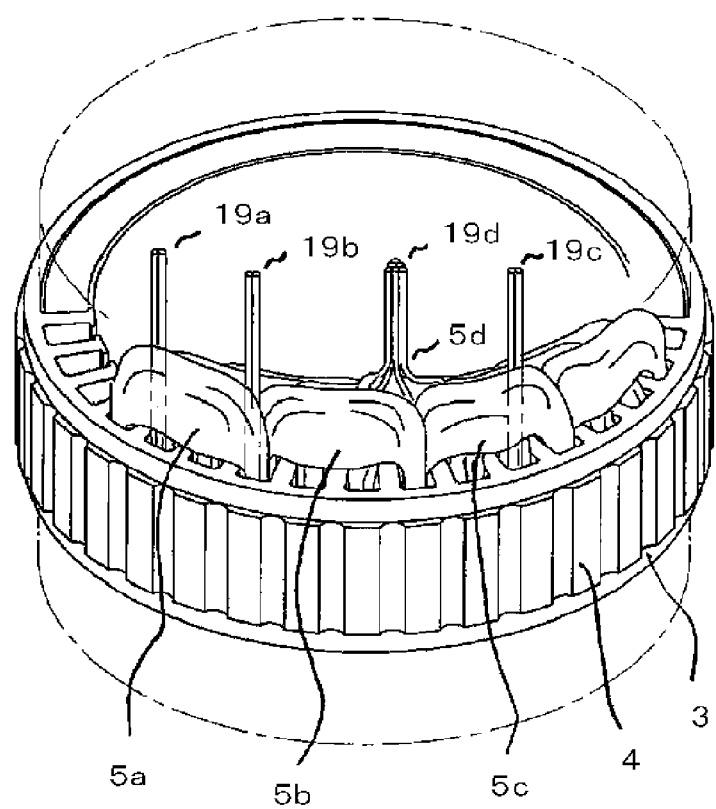
FIG. 2 is a perspective view showing the configuration of a stator of the vehicle AC generator according to the first embodiment of the present invention.
Figure 4:
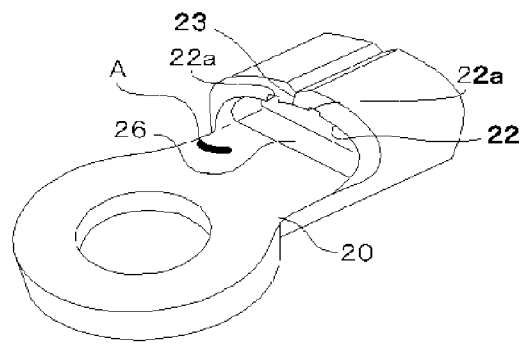
FIG. 4 is a perspective view showing the connection terminal according to the first embodiment of the present invention.
Figure 5:
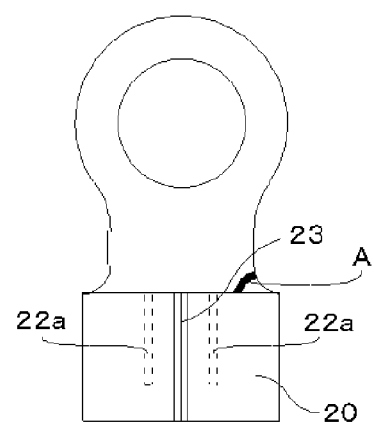
FIG. 5 is a plane view showing the connection terminal according to the first embodiment of the present invention.
Figure 6:
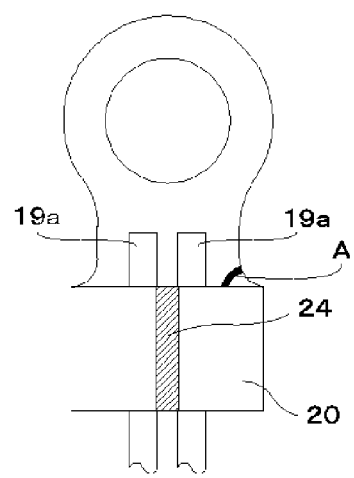
FIG. 6 is a plane view showing the connection terminal joined with the lead conductive wire according to the first embodiment of the present invention.

FIG. 1 is a sectional view showing the entire configuration of a vehicle AC generator according to the first embodiment of the present invention; FIG. 2 is a perspective view showing the configuration of a stator of the vehicle AC generator according to the first embodiment of the present invention; FIGS. 3A to 3C are sectional views showing a joining process of a lead conductive wire and a connection terminal according to the first embodiment of the present invention; FIG. 4 is a perspective view showing the connection terminal according to the first embodiment of the present invention; FIG. 5 is a plane view showing the connection terminal according to the first embodiment of the present invention; and FIG. 6 is a plane view showing the connection terminal joined with the lead conductive wire according to the first embodiment of the present invention.

It is noted that in these drawings, the same reference character denotes the same portion.

In the drawings, 1 denotes a front bracket of a vehicle AC generator; 2 denotes a rear bracket; 3 denotes a stator held between the front bracket 1 and the rear bracket 2 and composed of a stator core 4 and a stator coil 5; and 6 denotes a rotor. In addition to these components, the vehicle AC generator includes: a rotary shaft 7 supported at its both ends by the front bracket 1 and the rear bracket 2; rotor cores 8 and 9 attached on the rotary shaft 7; a field coil 10 wound between these rotor cores 8 and 9; fans 11 and 12 provided on the back surfaces of the respective rotor cores 8 and 9; and a slip ring 13 provided on the rotary shaft 7, for supplying current to the field coil 10. A plurality of blades are provided on each of the fans 11 and 12. 14 denotes a pulley provided on the rotary shaft 7.

15 denotes a brush for supplying current to the slip ring 13; 16 denotes a brush holder for holding the brush 15; 17 denotes a rectifier having a three-phase full-wave configuration, for rectifying AC output of the stator coil 5; and 18 denotes a regulator for adjusting current of the field coil 10, thereby controlling output voltage of the stator coil 5. These components are attached on the rear bracket 2. As shown in FIG. 2, the stator coil 5 wound on the stator core 4 is composed of three-phase stator coils 5a, 5b, and 5c and a neutral point 5d thereamong. As shown in FIG. 1, lead conductive wires 19a, 19b, 19c, and 19d of the respective stator coils 5a, 5b, 5c, and 5d are prolonged to the rear bracket 2 side, and the ends of the lead conductive wires are joined with a connection terminal 20 which is connected and fixed to a terminal 17a of the rectifier 17. It is noted that FIG. 2 shows an example where star connection is applied to the stator. The lead conductive wires 5d on the other end of the stator coils 5a, 5b, and 5c are collectively connected to each other to form a neutral point. Then, they are welded on a connection terminal 21 and also connected to the rectifier 17. The connection terminals 20 and 21 and the blade of the fan 12 face to each other with a minute clearance provided therebetween in the shaft direction.

In the vehicle AC generator configured as described above, the rotor cores 8 and 9 have respective magnetic pole pieces 8a and 9a facing to each other via a predetermined clearance on the inner circumferential side of the stator core 4 and arranged so as to be engaged with each other so that the magnetic pole pieces 8a and 9a are alternately magnetized to different magnetic poles by the field coil 10. The field coil 10 is excited via the brush 15 and the slip ring 13 by a battery not shown, and the rotor 6 is driven via the pulley 14 by an engine, whereby a rotational magnetic field occurs. Then, three-phase AC power is generated on the stator coil 5 and made into DC by the rectifier 17. Then, the DC power charges the battery and is supplied to a load not shown.

The stator coils 5a, 5b, and 5c present on the above power supply path are insulation-coated conductive wires such as a copper wire having an amide-imide-based insulation coating uniformly burned onto the outer circumference thereof. The lead conductive wires 19a, 19b, and 19c are welded with the connection terminal 20 without removing the insulation coating. This joining process of the connection terminal 20 is shown in FIGS. 3A to 3C, and FIG. 6 is a plane view for explaining the joined state after the welding.

FIG. 3A shows the state in which two lead conductive wires 19a are inserted into a tube-shaped hole portion 22 of the connection terminal 20. The connection terminal 20 is formed by a copper plate, and has the circular-tube-shaped hole portion 22 having no discontinuity, which is formed by rolling the copper plate into a circular-tube shape and joining its butting portions 23 by using copper phosphorus brazing material 24. Further, the connection terminal 20 has a tin coating with a thickness of 5 μm on its whole surface. On the inner circumference of the hole portion 22 of the connection terminal 20, groove portions 22a having a quadrangle sectional shape are formed at two positions across the butting portions 23 with equal intervals. Therefore, upon filling of the welded copper phosphorus brazing material 24 into the gap between the butting portions 23, the copper phosphorus brazing material 24 seeps on the inner circumference from between the butting portions 23. However, on the inner circumference, the copper phosphorus brazing material 24 flows into the groove portions 22a, whereby the copper phosphorus brazing material 24 is prevented from further flowing out. FIG. 3B shows the state in which, from the state of FIG. 3A, pressure and current are applied by an electrode 25 to perform pressure resistance welding. In the welding, the temperature increases up to about 1000° C., and the circular-tube-shaped hole portion 22 is flattened by the applied pressure and the temperature increase. Then, the two lead conductive wires 19a are arranged in a row in the flattened hole portion 22. FIG. 3C is a sectional view after the welding. The lead conductive wires 19a are also plastically deformed into an elliptic shape. In addition, since the carbonization temperature of an amide-imide-based insulation coating is about 600° C., the carbonized insulation coating gathers into a gap around the lead conductive wires 19a and tin is left being interposed between a concave portion 26 and the lead conductive wires 19a from which the insulation coating has been removed.

In addition, other two lead conductive wires 19b and two lead conductive wires 19c are also joined with the respective connection terminals 20 by pressure resistance welding. Further, similarly, six lead conductive wires 19d on the neutral point side are arranged in a row in the hole portion 22 of the connection terminal 21 on which the groove portions 22a having a quadrangle sectional shape are formed in advance at two positions across the butting portions 23 with equal intervals on the inner circumference of the hole portion 22, and then pressure and current are applied to the connection terminal 21 by the electrode 25 to perform pressure resistance welding, whereby the connection terminal 21 and the lead conductive wires 19d are joined.

As described above, in the first embodiment, the lead conductive wires 19a to 19d and the connection terminals 20 and 21 to be joined with the lead conductive wires 19a to 19d are provided; the connection terminals 20 and 21 each have the tube-shaped hole portion 22 having no discontinuity; a tin coating having a melting temperature equal to or lower than the carbonization temperature of the insulation coating of the lead conductive wires 19a to 19d is applied to the whole surfaces of the connection terminals 20 and 21; and the lead conductive wires 19a to 19d each inserted into the hole portion 22 are welded with the connection terminals 20 and 21 via the tin serving as a joining aid. Thus, owing to the tube-shaped hole portion 22 having no discontinuity, the lead conductive wires 19a to 19d can be easily inserted thereto and easily held therein, thereby realizing preferable productivity. In addition, upon welding, they are welded in a strained state without spread from the welding portion, whereby strong swaging force can be obtained and the dimension becomes stable. Therefore, the joining becomes stable and the connection reliability of the joining portion can be improved. In addition, since a tin coating having the melting temperature equal to or lower than the carbonization temperature of the insulation coating is applied and the lead conductive wires are welded with the connection terminals 20 and 21 via the tin, welding can be performed at a required position in a short time without unnecessary increase of the welding temperature, whereby productivity, insulation property, and vibration resistance are improved. In addition, since tin as a joining aid conducts heat well, peeling of the insulation coating is promoted and the welding temperature does not need to be increased unnecessarily, so that welding can be performed in a short time without damaging the coil. Further, owing to the synergy effect with the tube-shaped hole portion 22, welding can be performed in a strained state even by using tin having comparatively low melting temperature, and since the welding temperature is also low, the tin is hardly discharged and therefore is interposed at the joining portion, whereby a preferable connection reliability can be obtained. Further, since a tin coating is applied to the whole surface of each of the connection terminals 20 and 21, rust does not occur in a long period owing to the rust prevention effect, and the connection reliability of the connection terminals 20 and 21 is kept preferable. In addition, since the tin coating is used for both the rust prevention effect and the joining aid, the cost is reduced. Particularly, since the above configuration is applied to a vehicle AC generator which requires strict conditions of temperature, vibration, rust prevention, cost, and the like, a vehicle AC generator having an improved productivity and an enhanced reliability at the joining portion can be obtained.

In addition, in the present embodiment, on the inner circumference of the hole portion 22 of each of the connection terminals 20 and 21, the groove portions 22a having a quadrangle sectional shape are formed at two positions across the butting portions 23 with equal intervals. Therefore, upon brazing of the connection terminals 20 and 21, when the melted copper phosphorus brazing material 24 fills the gap between the butting portions 23, the copper phosphorus brazing material 24 seeping on the inner circumference from between the butting portions 23 flows into the groove portions 22a so that the copper phosphorus brazing material 24 is prevented from further flowing out beyond the groove portions 22a.

Therefore, it is possible to solve the conventional problem that, upon brazing of the connection terminals 20 and 21, the copper phosphorus brazing material 24 seeping on the inner circumference from between the butting portions 23 flows out to the inner circumference of the hole portion 22 of the connection terminals 20 and 21 or to a torsional portion A near the base of the connection terminals 20 and 21, which has a small mechanical strength, and then the portion to which the copper phosphorus brazing material 24 has flowed is hardened to be difficult to be deformed, whereby the "liquid-metal embrittlement phenomenon" due to melted metal of the tin coating or the phosphorus brazing material occurs upon the pressure resistance welding, resulting in occurrence of a crack.

Further, owing to the concave portion 26 provided on a part of the hole portion 22 of the connection terminals 20 and 21, upon the pressure resistance welding, the lead conductive wires 19a to 19c are each joined such that each of them is partially fitted into the concave portion, whereby the joining strength is increased and they can be more solidly joined with the connection terminals 20 and 21.

Second Embodiment

Figure 7:
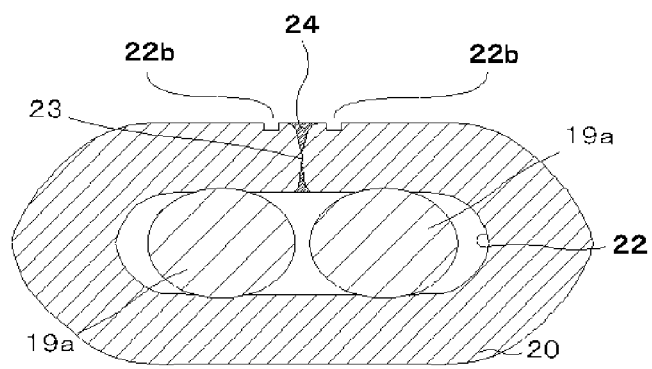
FIG. 7 is a sectional view showing a connection terminal joined with a lead conductive wire according to the second embodiment of the present invention.

FIG. 7 is a sectional view showing a connection terminal joined with a lead conductive wire according to the second embodiment of the present invention.

In FIG. 7, 22b denotes groove portions provided on the outer circumference of the hole portion 22 of the connection terminal 20 and having a quadrangle sectional shape, and they are formed at two positions across the butting portions 23 with equal intervals.

In the second embodiment, the copper phosphorus brazing material flowing out from the butting portions 23 on the outer circumference of the connection terminal 20 flows into the groove portions 22b, whereby the copper phosphorus brazing material 24 can be prevented from further flowing out. Therefore, the copper phosphorus brazing material 24 flowing out on the outer circumference of the connection terminal 20 can be prevented from flowing out beyond a predetermined range on the outer circumference of the hole portion 22 of the connection terminals 20 and 21, and the copper phosphorus brazing material 24 does not reach the torsional portion A near the base of the connection terminal 20. Therefore, unlike the conventional technique, upon fusing of the connection terminal 20 and the lead conductive wires 19a to 19c, the torsional portion A near the base of the connection terminal 20, which has a small mechanical strength, is not hardened or does not become hard to be deformed, so that the "liquid-metal embrittlement phenomenon" does not occur. Therefore, the problem of occurrence of a crack can be solved. In addition, the copper phosphorus brazing material 24 flowing out from the butting portions 23 of the connection terminal 20 flows into the groove portion 22b. Therefore, as compared to the conventional technique, the thickness in the shaft direction of the copper phosphorus brazing material 24 adhering on the outer circumference of the hole portion 22 of the connection terminal 20 becomes small, and the adhesion area also becomes narrow. Therefore, unlike the conventional technique, even if salt water or the like invades the clearance in the shaft direction between the outer circumference of the hole portion 22 of the connection terminal 20 and the blade of the cooling fan 12, since the clearance in the shaft direction is large and the range thereof is also wide, leakage current does not flow between the connection terminal (positive potential) and the blade of the cooling fan 12 (negative potential). Therefore, promotion of electrochemical corrosion of the connection terminal 20 can be prevented, and the reliability of the connection terminal 20 can be improved.

In addition, the present embodiment can be more effectively applied to a vehicle AC generator in which a ring-shaped side plate is provided on the end surface in the shaft direction of the blade of the cooling fan 12, because the range of a portion facing to the outer circumference of the hole portion 22 of the connection terminal 20 increases.

Third Embodiment

Figure 8:
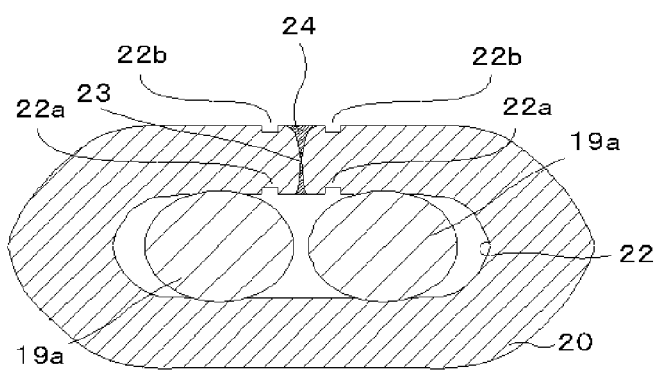
FIG. 8 is a sectional view showing a connection terminal joined with a lead conductive wire according to the third embodiment of the present invention.

FIG. 8 is a sectional view showing a connection terminal joined with a lead conductive wire according to the third embodiment of the present invention.

In FIG. 8, groove portions 22a and 22b having a quadrangle sectional shape are respectively provided on the inner circumference and the outer circumference of the hole portion 22 of the connection terminal 20. The groove portions 22a and the groove portions 22b are both formed at two positions across the butting portions 23 with equal intervals.

In the third embodiment, since the groove portions 22a and 22b having a quadrangle sectional shape are respectively provided on the inner circumference and the outer circumference of the hole portion 22 of the connection terminal 20, the copper phosphorus brazing material 24 flowing out on the inner circumference and the outer circumference from between the butting portions 23 of the connection terminal 20 flows into the groove portions 22a and 22b provided near the butting portions 23, so that the copper phosphorus brazing material 24 is prevented from flowing out beyond the groove portions 22a and 22b.

Therefore, as compared to the above first and second embodiments, the copper phosphorus brazing material 24 can be more reliably prevented from adhering on the inner circumference and the outer circumference of the hole portion 22 of the connection terminal 20 beyond a predetermined range, and from reaching the torsional portion A near the base of the connection terminal 20. Therefore, it is ensured that occurrence of a crack is prevented, and promotion of electrochemical corrosion of the connection terminal 20 can be prevented, whereby the reliability can be improved.

Fourth Embodiment

Figure 9:
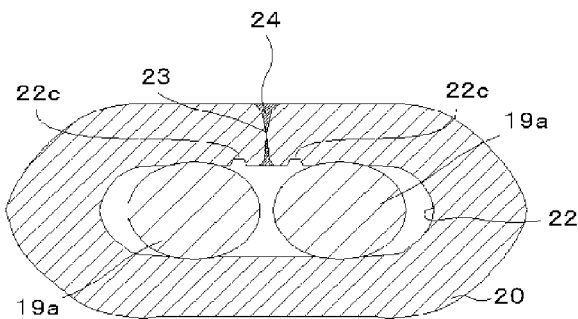
FIG. 9 is a sectional view showing a connection terminal joined with a lead conductive wire according to the fourth embodiment of the present invention.

FIG. 9 is a sectional view showing a connection terminal joined with a lead conductive wire according to the fourth embodiment of the present invention.

In FIG. 9, 22c denotes groove portions provided on the inner circumference of the hole portion 22 of the connection terminal 20 and having a trapezoid sectional shape, and the groove portions 22c are formed at two positions across the butting portions 23 with equal intervals. The distance from the butting portions 23 to the groove portions 22c and the volume thereof are set so that the copper phosphorus brazing material 24 flowing out from between the butting portions 23 will not flow out beyond the groove portions 22c after filling them.

In the fourth embodiment, similarly to the above first embodiment, since the copper phosphorus brazing material 24 flowing out from between the butting portions 23 of the connection terminal 20 flows into the groove portion 22c, the copper phosphorus brazing material 24 can be prevented from exceeding the groove portions 22c and adhering on the inner circumference of the hole portion 22 beyond a predetermined range, and from reaching the torsional portion A near the base of the connection terminal 20. Therefore, occurrence of a crack can be prevented.

Fifth Embodiment

Figure 10:
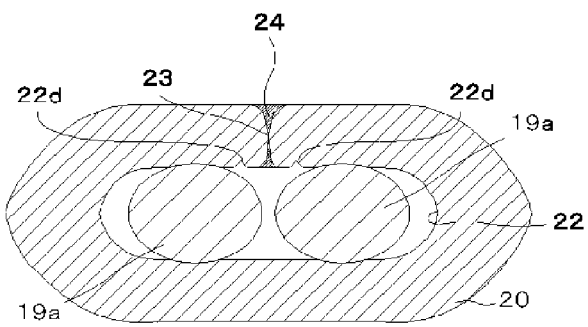
FIG. 10 is a sectional view showing a connection terminal joined with a lead conductive wire according to the fifth embodiment of the present invention.

FIG. 10 is a sectional view showing a connection terminal joined with a lead conductive wire according to the fifth embodiment of the present invention.

In FIG. 10, 22d denotes groove portions provided on the inner circumference of the hole portion 22 of the connection terminal 20 and having a triangle sectional shape, and the groove portions 22d are formed at two positions across the butting portions 23 with equal intervals. The distance from the butting portions 23 to the groove portions 22d and the volume thereof are set so that the copper phosphorus brazing material 24 flowing out from between the butting portions 23 will not flow out beyond the groove portions 22d after filling them.

In the fifth embodiment, similarly to the above first embodiment, since the copper phosphorus brazing material 24 flowing out from between the butting portions 23 of the connection terminal 20 flows into the groove portion 22d, the copper phosphorus brazing material 24 can be prevented from exceeding the groove portions 22d and adhering on the inner circumference of the hole portion 22 beyond a predetermined range, and from reaching the torsional portion A near the base of the connection terminal 20. Therefore, occurrence of a crack can be prevented.

Sixth Embodiment

Figure 11:
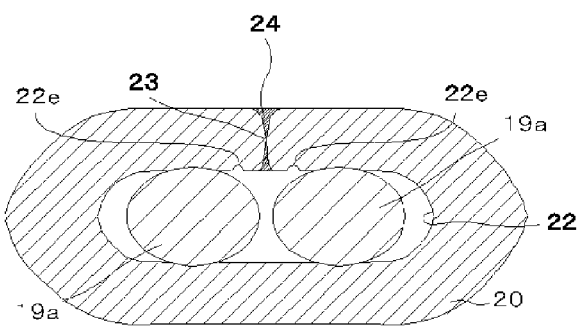
FIG. 11 is a sectional view showing a connection terminal joined with a lead conductive wire according to the sixth embodiment of the present invention.

FIG. 11 is a sectional view showing a connection terminal joined with a lead conductive wire according to the sixth embodiment of the present invention.

In FIG. 11, 22e denotes groove portions provided on the inner circumference of the hole portion 22 of the connection terminal 20 and having a semicircle sectional shape, and the groove portions 22e are formed at two positions across the butting portions 23 with equal intervals. The distance from the butting portions 23 to the groove portions 22e and the volume thereof are set so that the copper phosphorus brazing material 24 flowing out from between the butting portions 23 will not flow out beyond the groove portions 22e after filling them.

The sixth embodiment can also provide the same functional effect as in the above first embodiment.

It is noted that also in the above fourth to sixth embodiments, the groove portions 22c to 22e may be provided on the outer circumference of the hole portion 22 of the connection terminal 20 as in the above second embodiment. Alternatively, the groove portions 22c to 22e may be provided on both the inner circumference and the outer circumference of the hole portion 22 of the connection terminal 20 as in the above third embodiment, whereby occurrence of a crack on the connection terminal 20 can be more reliably prevented.

In the above embodiments, the case where the groove portions 22a, 22c, 22d, and 22e on the inner circumference have a sectional area equal to that of the groove portions 22b on the outer circumference, has been shown as an example. However, a large amount of brazing material such as the copper phosphorus brazing material 24 flows into the groove portions 22b on the outer circumference. Therefore, if the sectional area of the groove portions 22b on the outer circumference is set to be larger than that of the groove portions 22a, 22c, 22d, and 22e on the inner circumference, the brazing material can be reliably stored into the groove portion 22b and can be prevented from flowing out beyond the groove portion 22b.

In the above embodiments, the case where the groove portions 22a, 22c, 22d, and 22e on the inner circumference are provided on both sides of the butting portions 23, has been shown as an example. Instead, such a groove portion may be provided only on the rotational-direction side with respect to the butting portion 23, i.e., the left side in the drawing. That is, upon brazing welding of the connection terminals 20 and 21, they are fixed on a fixture and sequentially brazed while they are rotated. After the brazing has been completed, they are rotated by a predetermined angle and then stopped. Due to the impact force caused at the time of the stop, the copper phosphorus brazing material 24 seeping from the butting portion 23 flies toward the rotational-direction side. Therefore, by providing the groove portion 22a on the rotational-direction side, the copper phosphorus brazing material 24 can be more effectively prevented from flowing out.

In the above second to sixth embodiments, the configuration for joining two lead conductive wires with the connection terminal 20 has been shown as an example. However, such a configuration can be also applied to the case of joining six lead conductive wires on the neutral point side with the connection terminal 21.

Although the above embodiments have been applied to a vehicle AC generator as an example, as a matter of course, they can be also applied to a starter-and-generator electric machine having both functions of a starter motor and an AC generator for a vehicle.

In the above embodiments, the case of employing the copper phosphorus brazing material 24 as material for joining the connection terminals 20 and 21 into a circular-tube shape, has been shown as an example, but the material is not limited thereto. For example, silver brazing material may be used.

Various modifications and alterations of this invention will be apparent to those skilled in the art without departing from the scope and spirit of this invention, and it should be understood that this is not limited to the illustrative embodiments set forth herein.

What is claimed is:

1. A rotary electric machine comprising:
   a conductive wire having an insulation coating; and
   a connection terminal joined with the conductive wire, wherein
   the connection terminal has a tube-shaped hole portion having no discontinuity, which is formed by rolling metallic plate material to be butted and joining butting portions via brazing material through brazing work, so that the conductive wire inserted into the hole portion is joined with the connection terminal by fusing, and
   a groove portion that can prevent the brazing material from flowing out from between the butting portions is provided on at least one of the inner circumference and the outer circumference of the hole portion of the connection terminal.

2. The rotary electric machine according to claim 1, wherein the groove portions are provided at two positions across the butting portions of the connection terminal, on the inner circumference of the hole portion.

3. The rotary electric machine according to claim 1, wherein the brazing material for joining the butting portions of the connection terminal is copper phosphorus brazing material.

4. The rotary electric machine according to claim 1, wherein the conductive wires are arranged in a row in the hole portion of the connection terminal.

5. The rotary electric machine according to claim 1, wherein the groove portion is formed to have a rectangular sectional shape.

6. The rotary electric machine according to claim 1 wherein the groove portion is formed to have a semicircle sectional shape.

7. The rotary electric machine according to claim 1, wherein the groove portion provided on the outer circumference of the hole portion is formed to have a larger sectional area than that of the groove portion provided on the inner circumference of the hole portion.

8. The rotary electric machine according to claim 1, wherein on the inner circumference, the groove portion is provided only on the rotational-direction side with respect to the butting portions of the connection terminal.

9. The rotary electric machine according to claim 1, wherein the groove portion provided on the outer circumference is formed to face to a blade of a cooling fan via a clearance in a shaft direction.

* * * * *